(12) United States Patent
Larose

(10) Patent No.: US 11,439,151 B2
(45) Date of Patent: Sep. 13, 2022

(54) PROCESS FOR TREATING AN AGRICULTURAL MEDIUM

(71) Applicant: BioSafe Systems LLC, East Hartford, CT (US)

(72) Inventor: Robert Larose, East Hartford, CT (US)

(73) Assignee: BioSafe Systems LLC, East Hartford, CT (US)

( * ) Notice: Subject to any disclaimer, the term of this patent is extended or adjusted under 35 U.S.C. 154(b) by 334 days.

(21) Appl. No.: 16/165,520

(22) Filed: Oct. 19, 2018

(65) Prior Publication Data

US 2019/0116802 A1 Apr. 25, 2019

Related U.S. Application Data

(60) Provisional application No. 62/575,188, filed on Oct. 20, 2017.

(51) Int. Cl.
| | | |
|---|---|---|
| *A01N 63/22* | (2020.01) | |
| *A01N 59/00* | (2006.01) | |
| *A01N 37/02* | (2006.01) | |
| *A01N 25/30* | (2006.01) | |
| *A01N 37/16* | (2006.01) | |
| *A01N 63/38* | (2020.01) | |

(52) U.S. Cl.
CPC ............. *A01N 63/22* (2020.01); *A01N 25/30* (2013.01); *A01N 37/02* (2013.01); *A01N 37/16* (2013.01); *A01N 59/00* (2013.01); *A01N 63/38* (2020.01)

(58) Field of Classification Search
CPC ........ A01N 63/00; A01N 63/30; A01N 37/16; A01N 25/30; A01N 37/02; A01N 59/00; A01N 63/22; A01N 63/38
USPC ....................................................... 424/93.3
See application file for complete search history.

(56) References Cited

U.S. PATENT DOCUMENTS

| | | | | |
|---|---|---|---|---|
| 4,545,396 A | * | 10/1985 | Miller | A01G 25/16 137/78.3 |
| 5,489,706 A | * | 2/1996 | Revell | A01N 37/16 562/3 |
| 5,607,856 A | * | 3/1997 | Moon | A01N 37/16 422/28 |
| 6,923,937 B2 | | 8/2005 | Storkan et al. | |
| 8,663,669 B2 | | 3/2014 | Aubert et al. | |
| 10,081,784 B2 | | 9/2018 | Del Negro et al. | |
| 2003/0147774 A1 | | 8/2003 | Celli | |
| 2009/0186767 A1 | * | 7/2009 | Arbogast | A01N 37/04 504/313 |

OTHER PUBLICATIONS

"saturate". Merriam-Webster.com. Retrieved Apr. 6, 2020 from https://www.merriam-webster.com/dictionary/saturate?src=search-dict-hed (Year: 2020).*
Envirotech, "Peragreen 15%" MSDS (Year: 2016).*
Davey: Proven solutions fora growing world. 2014. Soil and Trunk Injection Treatments. Retrieved from: https://www.davey.com/arborist-advice/articles/soil-and-trunk-injection-treatments/ (Year: 2014).*
Woo, S. L. et al. 2014. Trichoderma-based products and their widespread use in agriculture. The Open Mycology Journal. 8:71-126. (Year: 2014).*
USDA. 2016. Technical Evaluation Report: Peracetic Acid. Retrieved from: https://www.ams.usda.gov/sites/default/files/media/Peracetic%20Acid%20TR%203_3_2016%20Handling%20final.pdf. (Year: 2016).*
Slusarski, C. (2000). The Use of Disinfectants for Controlling a Soilborne Foot and Root Rot Disease Complex on Greenhouse Tomatoes in the Rockwool Open Culture System. Acta Hortic. 532, 217-224. DOI: 10.17660/ActaHortic.2000.532.29.*
Lucas Garcia et al., Agronomie, 2004, vol. 24, p. 169-176.*
Wikipedia, Peracetic acid, 4 pages of pdf, retrieved on Aug. 4, 2021.*
U.S. Environmental Protection Agency (EPA) Memorandum, Peroxy Compounds: Hydrogen Peroxide and Peroxyacetic Acid Environmental Fate Science Chapter, 2007, p. 1-35.*
Sehsah et al., Misr Journal of Agricultural Engineering, Article 1, vol. 29, Issue 3, 2012, p. 875-892.*
"EPA" Communication, Jun. 2015, Perasan OG Antimicrobial Solution, 7 pages of PDF including the cover letter.*
Peracetic Acid, Crops, Nov. 6, 2000.

\* cited by examiner

*Primary Examiner* — Kade Ariani
(74) *Attorney, Agent, or Firm* — Paul & Paul

(57) ABSTRACT

An agricultural medium to control plant disease and nematodes by first applying to the agricultural medium an effective amount of an aqueous peroxyacetic acid composition; and then inoculating the soil with beneficial organisms.

10 Claims, 2 Drawing Sheets

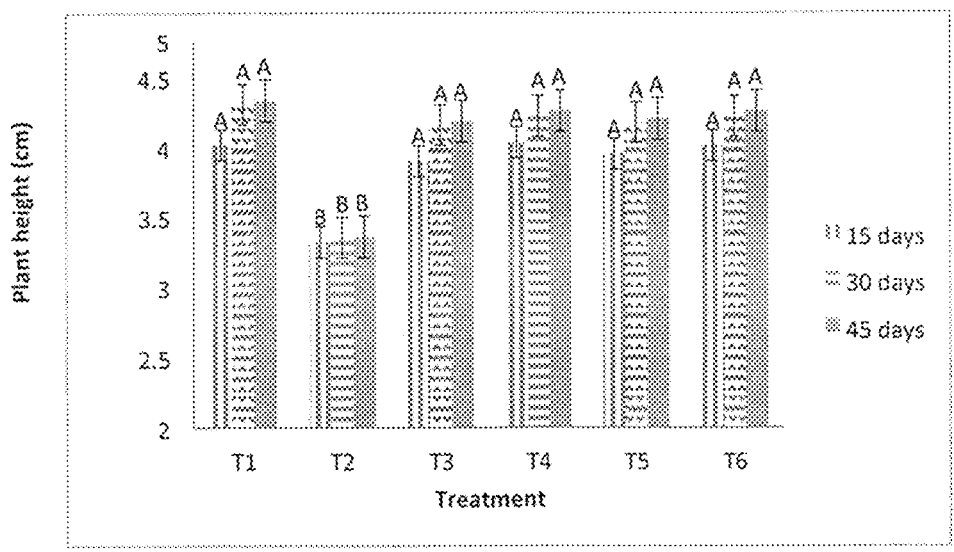
Fig. 1
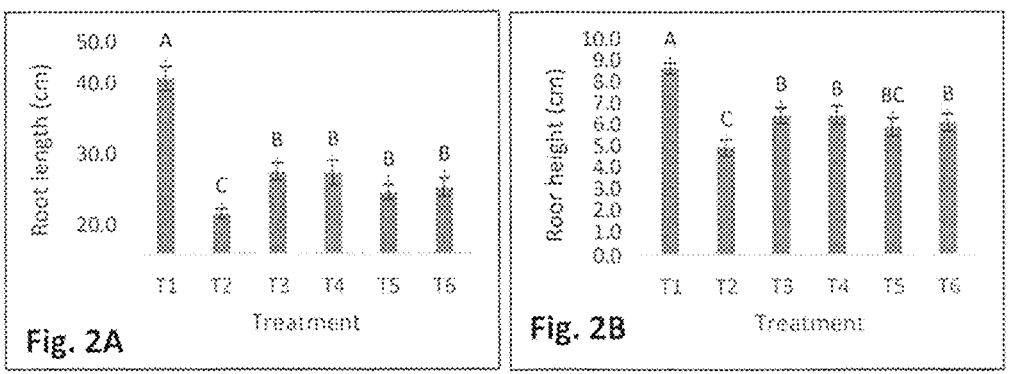
Fig. 2A
Fig. 2B
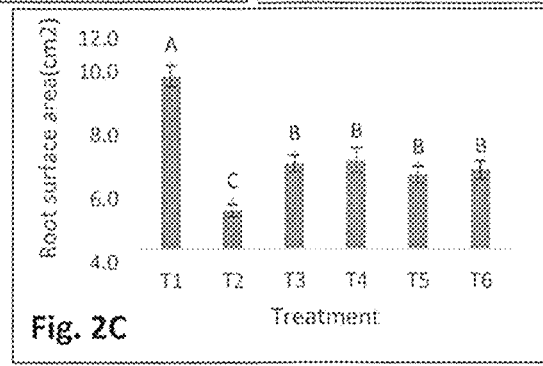
Fig. 2C

PROCESS FOR TREATING AN AGRICULTURAL MEDIUM

CROSS-REFERENCE TO RELATED APPLICATION

The present application claims the benefit of the priority of U.S. Provisional Patent Application 62/575,188 filed Oct. 20, 2017, which is incorporated by reference herein in its entirety.

BACKGROUND OF THE INVENTION

1. Field of the Invention

The present invention relates to a process for pre-planting soil fumigation.

2. Brief Description of the Prior Art

Pre-plant soil fumigation is a standard practice for prevention/control of soil borne plant pathogens, plant parasitic nematodes and weed seeds in conventional field/nursery grown food and ornamental crops. Soil fumigants such as those based on methyl bromide, chloropicrin, 1,3-dichloropropene, dimethyl sulfide and metam sodium/potassium are part of these fumigation protocols. With gradual phase out of methyl bromide from the list of approved fumigants due to concerns primarily of ozone layer depletion, growers are limited to use other approved fumigants on the list which still come with many challenges and/or safety measures during their application, due to their residual toxicity concerns, such as long pre-plant application interval, maintaining buffer zones, worker protection and site specific management plans and emergency preparedness for workers and surrounding communities in the event of accidental non-target off gassing, etc. In addition, use of pre-plant soil fumigation or post-plant conventional soil fungicides is not an option for growers of organic crops leaving them with limited to no options for effective pathogen control and maintaining the crop productivity.

SUMMARY OF THE INVENTION

The present invention relates to novel compositions based on peracetic acid ("PAA") and in conjunction with biological methods for controlling soil borne plant pathogens and plant parasitic nematodes in conventional and organic agricultural and ornamental crops as an alternative to toxic usage of pre-plant soil fumigants and post-plant conventional soil bactericide/fungicide chemistries.

The present process provides for application of aqueous peroxyacetic acid compositions, followed by application of biological formulations. The present process provides an effective and safe alternative for soil borne pathogen and plant parasitic nematode control for both conventional and organic growers. Aqueous peroxyacetic acid compositions provide contact kill properties, leave no toxic residuals, have low toxicity and are approved for organic agricultural use. Biological formulations provide a preventative mode of action, have safe residual properties, have low or zero toxicity, and are also approved for organic agricultural use.

The present invention provides a soil treatment and microbicide for use in control of soil-borne plant pathogens, pests and nematodes in field grown crops. The chemistry of the present invention is designed to be aggressive on pathogens but gentle on the environment allowing effective soil treatment with a minimal plant back interval. The treatment of the present invention is non-residual, has no mutational resistance and is an ideal alternative to conventional fumigation for pre-plant soil treatment.

In a currently preferred embodiment, a high strength peracetic acid is employed to treat the soil in a high volume manner to reduce the population of potential soil pathogens and pests, and then immediately inject beneficial bacterial and fungal organisms, which essentially fills the void created and allows the newly planted crop to become established and have a reduced chance of being attacked by the soil pathogens that have taken up residence in the soil.

In a currently preferred embodiment, the present invention provides a mixture of hydrogen peroxide, peroxyacetic acid and acetic acid to reduce the populations of organisms below the infection threshold, and does not produce a residual that will inhibit the introduction of the beneficial organisms.

The peracetic acid treatment just prior to the soil inoculation of beneficial organisms does not create any toxic residuals, so that the soil can be immediately inoculated with beneficial microorganisms which because of the super oxygenated environment that the peracetic acid leaves behind are able to establish themselves in the soil.

The peroxyacetic acid compositions for use in the process of the present invention can be stabilized aqueous equilibrium solutions comprising, for example, peroxyacetic acid, preferably having a concentration of 2.0-28 percent by weight, hydrogen peroxide, preferably having a concentration of 10.0-22.0 percent by weight, acetic acid, and stabilizer(s).

The peroxyacetic acid compositions for use in the process of the present invention can be a non-equilibrium peroxyacetic acid, such as a peroxyacetic acid generated on site by the use of a peroxyacetic acid generator that combines water, hydrogen peroxide, an acetate, and a caustic material such as either sodium hydroxide or potassium hydroxide, that react to form a high pH and unstabilized form of an aqueous peroxyacetic acid solution. The non-equilibrium peroxyacetic acid composition may have, for example, 2.0-4.0 percent by weight peroxyacetic acid, 1.5-3.0 percent by weight hydrogen peroxide. Non-equilibrium peroxyacetic acid compositions which can be employed in the process of the present invention are disclosed in U.S. Pat. No. 10,081,784, incorporated herein by reference. Further, equilibrium peroxyacetic acid aqueous compositions such as stabilized, low or neutral pH aqueous compositions having, for example, 2.0-4.0 weight percent peroxyacetic acid, and 1.5-3.0 weight percent hydrogen peroxide, are neutralized by the addition of mineral or organic acids such as sulfuric acid, phosphoric acid, nitric acid, citric acid or lactic acid.

Thus, in one aspect the present invention provides a process for treating an agricultural medium to control plant disease and nematodes. The process comprises (a) applying to the agricultural medium an effective amount of an aqueous peroxyacetic acid composition; and (b) inoculating the soil with beneficial organisms subsequent to the application of peroxyacetic acid composition to the soil. Preferably, the soil is inoculated within three days of the application of the peroxyacetic acid composition. In one presently preferred embodiment, the aqueous peroxyacetic acid composition comprises from 2.0 to 30 percent by weight peroxyacetic acid, and preferably from 2.5 to 22.0 percent by weight peroxyacetic acid. The peroxyacetic acid composition preferably further comprises from 10.0 to 22.0 percent by weight hydrogen peroxide. Further, the peroxyacetic acid composition preferably further comprises acetic acid. In addition, the peroxyacetic acid composition further includes at least one non-ionic surfactant, which are preferably selected from the group comprising alcohol ethoxylates.

Preferably, the peroxyacetic acid composition is applied to the agricultural medium by spraying, drenching, injecting, sprinkling or infusing the peroxyacetic acid composition into the agricultural medium. In one aspect of the process of the present invention, the peroxyacetic acid is applied to the soil by a direct injection technique. In another aspect of the process of the present invention, the peroxyacetic acid is applied to the soil by a soil drench technique.

In another aspect of the process of the present invention, the beneficial organisms comprise one or more species of *Bacillus* and *Trichoderma*, and preferably at least one of *Bacillus licheniformis, Bacillus subtilis, Bacillus pumilus, Bacillus amyloliquefaciens, Bacillus megaterium, Trichoderma harzianum*, and *Trichoderma reesei*.

In another aspect of the process of the present invention the agricultural medium comprises soil, sand, or a synthetic growth medium.

BRIEF DESCRIPTION OF THE FIGURES

FIG. 1 is bar graph displaying the height of the seedlings treated according to the process of the present invention.

FIG. 2A displays root length (cm) measured at 45 days post application.

FIG. 2B displays root height (cm) of the samples of FIG. 2A.

FIG. 2C displays root surface area ($cm^2$) of the samples of FIG. 2A.

DETAILED DESCRIPTION

Figure 3:
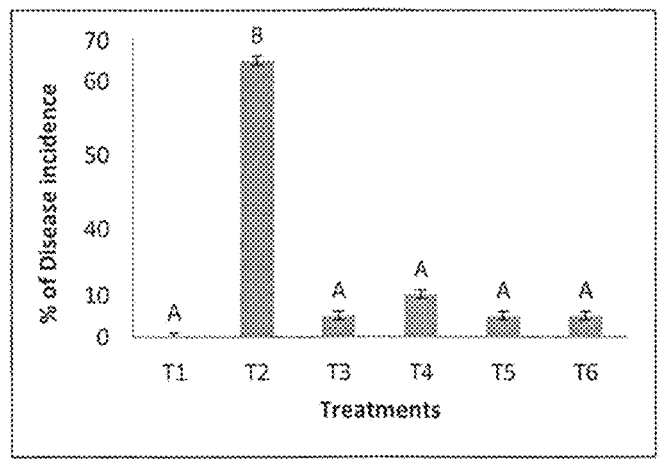
FIG. 3 displays disease assessment per treatments under greenhouse condition.

The process of the present invention is directed to the use of formulations for treatment of soil to control soil-borne plant pathogens, such as fungi, bacteria, fungi-like organisms (oomycetes) and plant parasitic nematodes. The treatment formulations include peracids, such as peroxyacetic acid, and optionally non-ionic surfactants, such as alcohol ethoxylates.

Peracetic acid (also known as peroxyacetic acid, or "PAA"), is a organic compound with the formula $CH_3CO_3H$. Peroxyacetic acid can be employed in the process of the present invention in the form of an aqueous equilibrium mixture of acetic acid (AA), hydrogen peroxide ($H_2O_2$) and peroxyacetic acid (PAA). The composition of mixture may vary with a weight ratio of PAA:hydrogen peroxide preferably between 1:0.82 to 1:13.5. Commercially available peracetic acid solutions can include, for example, 28 percent by weight PAA and 23 percent by weight $H_2O_2$ and 18 percent by weight AA, 15 percent by weight PAA with 10 percent by weight $H_2O_2$ and 40 percent by weight AA, 12 percent by weight PAA with 18.5 percent by weight $H_2O_2$ and 20 percent by weight AA, 5.0 percent by weight PAA with 27 percent by weight $H_2O_2$ and 8 percent by weight AA, and 2.0 percent by weight PAA with 27.1 percent by weight $H_2O_2$ and 3.5 percent by weight AA.

One or more non-ionic surfactants can be included in the peroxyacetic acid aqueous composition, such as alcohol ethoxylates or alkoxylated polyols. Non-ionic surfactants which may be employed in preparing the aqueous compositions used in the process of the present invention are disclosed, for example, in U.S. Pat. Nos. 9,919,979; 8,673,819; and 6,117,820, all incorporated herein by reference.

Thus, the aqueous compositions useful in the process of the present invention can include a peracid, for example peroxyacetic acid, and a non-ionic surfactant, for example, one or more alcohol ethoxylates. The peracid and the non-ionic surfactant can be diluted with water to the desired concentrations and combined at the point of use. Alternatively, or in addition, the peracid and the non-ionic surfactant can be combined to form a mixture and the mixture can be diluted with water before use. The peracid and the non-ionic surfactant can be combined and stored before use or they can be combined and used directly. Alternatively, soil is pre-wetted with non-ionic surfactant(s) followed by application of an aqueous peroxyacetic acid solution, such as a dilute aqueous peroxyacetic acid solution.

The compositions employed in the formulation of the aqueous composition for the process of the present invention can further include sequestrants such as dipicolinic acid and/or 1-hydroxyethylidene-1,1,-diphosphonic acid, as well as other ingredients such as mineral acid catalysts, such as, for example, sulfuric, nitric, or phosphoric acids.

The aqueous composition useful in the process of the present invention can be pre-diluted with water before use, and the diluted formulation can be applied using application techniques such as drench application and chemigation, such as disclosed in U.S. Pat. Nos. 4,545,396; 5,022,585; 5,740,031; and U.S. Patent Publications 2009/0186767A1; and 2014/0047766A1; all incorporated herein by reference.

These aqueous compositions can be applied prior to any seed or transplants being planted into the soil and/or post-seeding/transplanting in season. For pre-seeding or pre-transplanting applications, they are typically and preferably applied 24-48 hours prior to seeding or transplanting, especially when using concentrations of 500 ppm (parts per million) PAA or greater.

The present formulations may be used in conjunction with the introduction of beneficial microbial formulations of a complex group of beneficial bacteria based on *Bacillus* spp. and beneficial fungi based on *Trichoderma* spp. that are applied directly following a treatment of peracid to the soil being treated. These complexes of beneficial bacteria and fungi are introduced within 1 to 24 hours following the application of the peroxyacetic acid treatments to control plant parasitic nematodes and soil-borne plant pathogens of bacteria, fungi and fungi like organisms (oomycete group) origin.

The invention utilizes the concept of soil being pre-treated with a desired concentration of peracetic acid solution to reduce the population of resident propagules of plant pathogenic bacteria, fungi and fungi like organisms that are in the soil to a level that fall below the threshold level that could otherwise result in plant infections. Application of beneficial microbial formulations post PAA application can result in beneficial organisms occupying the niches that were previously being occupied by plant pathogens in their dormant state and protect roots from any infections caused by plant pathogens that were unaffected 100% from previous PAA applications. Additional advantages with pre-treatment of soil with PAA for follow-up treatment with beneficial microbial formulations include reduced competition thereby applied beneficial microbes can grow and occupy soil niches at a faster rate and outcompete growth of any resident plant pathogen populations. Beneficial microbes, in addition to having direct activity against plant pathogen populations in soil through mechanisms of competition and anti-biosis, can also have indirect activity through induction of systemic resistance in the plants helping plants to resist infection from soil borne plant pathogens and plant parasitic nematodes.

Plant pathogens include but are not limited to *Phytophthora nioctianae, Phytophthora capsici, Macrophomina phaseolina, Phytophthora cinnamomi, Pythium macrosporum, Pythium sterilum, Pythium sylvaticum, Cylindrocarpon* sp., *Pythium undulatum, Phytophthora rubi, Pythium attrantheridium, Rhizoctonia fragariae, Pythium ultimum, Fusarium oxysporum, Verticillium dahliae* and *Ralstonia solanacearum*.

Plant parasitic nematodes include but are not limited to root knot nematodes such as *Meloidogyne hapla, Meloidogyne incognita, Meloidogyne enterolobii* and *Meloidogyne mayaguensis*, cyst nematodes such as soybean cyst nematodes (*Heterodera glycines*); potato cyst nematodes (*Globodera pallida* and *G. rostochiensis*) and cereal cyst nematodes (*Heterodera avenae* and *H. filipjevi*; root lesion nematodes such as *Pratylenchus* spp., including *P. penetrans, P. thomei, P. neglectus, P. zeae, P. vulnus* and *P. coffeae*; and the burrowing nematode, *Radopholus similis*.

Specific methods of applying diluted peroxyacetic acid solution to soil include pre-wetting of soil with water (preferably with a non-ionic surfactant added) to bring the soil to be treated to 95% of field capacity. This will allow the follow-up application of peracetic acid formulation to easily percolate within the soil particles through capillary action and better distribution to deeper layers of soil.

Specific methods of applying follow-up beneficial microbial formulations to soil include seed dip or transplant root dip, transplant drench, in-furrow application at planting, side dress and chemigation (drip or sprinkler).

As used in the present application, percent (%) means percent by weight unless otherwise specified, "cfu" means colony forming unit, and "v/v" means volume for volume

EXAMPLES

Example 1

A greenhouse non-plant assay with solutions equivalent to 500, 2000 and 5000 ppm (parts per million) PAA prepared from a stabilized aqueous peroxyacetic acid composition having 12 percent by weight PAA with 18.5 percent by weight $H_2O_2$ and 20 percent by weight AA composition and applied as a one-time stand-alone soil drench with no surfactant to sterile soil inoculated with *Phytophthora capsici, Macrophomina phaseolina* and *Fusarium oxysporum*.

Summary of Materials/Methods/Results:
*Macrophomina phaseolina:*

One-gallon pots were filled with charcoal rot (*Macrophomina phaseolina*) infected soil and placed on greenhouse benches. The treatments were replicated three times and the sample size was one pot per replication. Diluted formulations of PAA (500, 2000 and 5000 ppm PAA) were prepared and applied to pots using a graduated cylinder to drench the soil. Soil samples were collected two days after application. All PAA treatments lowered the cfu counts as compared to the untreated control. The counts from the 2000 ppm PAA rate were lower than the untreated control to a statistically significant degree. The 5000 ppm rates had the lowest counts but the difference was not statistically different than the counts from the 2000 ppm PAA rate.

*Fusarium oxysporum:*

One-gallon pots were filled with *fusarium* (*Fusarium oxysporum* f. *lycopersici*) infected soil and placed on greenhouse benches. The treatments were replicated three times and the sample size was one pot per replication. Diluted formulations of PAA (500, 2000 and 5000 PPM PAA) were prepared and applied to pots using a graduated cylinder to drench the soil. Soil samples were collected two days after application. All PAA treatments lowered the cfu counts as compared to the untreated control. The counts from the 2000 ppm PAA rate were lower than the untreated control to a statistically significant degree. The 5000 ppm PAA rates had the lowest counts.

*Phytophthora capsici:*

One gallon pots were filled with *Phytophthora* (*Phytophthora capsici*) infected soil and placed on greenhouse benches. The treatments were replicated three times and the sample size was one pot per replication. Diluted formulations of PAA (500, 2000 and 5000 PPM PAA) were prepared and applied to pots using a graduated cylinder to drench the soil. Soil samples were collected two days after application. The counts from 2000 and 5000 ppm PAA concentration rates were lower than the untreated control to a statistically significant degree.

Example 2

In a greenhouse assay citrus seedlings (sour orange) were inoculated with *Phytophthora nicotianae* and treated with peroxyacetic acid formulations pre and/or post-planting as a stand-alone and in combination with beneficial microbial formulations. Treatments were assessed for plant vigor (plant height and root measurement) and root rot incidence and severity.

Summary of Materials/Methods/Results:

An isolate of *Phytophthora nicotianae* was grown on 10% V8 juice agar medium and then incubated in darkness for 10-14 days at 25 degrees C. V8 juice agar promotes the sporulation. After complete sporulation, six small 5-mm diameter plugs of pathogen-colonized agar were flooded on sterile distilled water in a petri dish. Zoospore releases were induced by chilling at 4° C. for 20 min. Zoospores ($2.5 \times 10^4$ spores/ml) on the surface of water was measured under microscope (100× magnification). Seeds of sour orange were collected from the fresh fruits. The seeds were then sterilized with 10% bleach solution for 20 min and rinsed four times with sterile distilled water. The moist seeds were air dried under laminar airflow. At least 120 seeds were sown in the tray containing potting mixture. The tray was then irrigated and covered with thin plastic sheet to retain moisture until germination of seeds. Trays were irrigated twice a week in the green house under controlled conditions (23 to 25° C., photoperiod of 16 and 8 h, light and darkness, respectively). Two independent experiments were performed in the green house under controlled conditions. Once the sour orange seedlings were one month old, ten single seedlings (two leaf stage) with uniform height were selected for each treatment. Seedlings (for treatments T2, T3, T4, T5 and T6) were infected with *P. nicotianae* zoospore inoculum ($2.5 \times 10^4$ spores/ml) for 4-5 hours and then transferred into the plastic pots which were filled with soil. Treatments were categorized as:

T1=untreated control (healthy seedling)
T2=untreated control (inoculated with *P. nicotianae* alone)
T5=aqueous/stabilized 12% PAA with 18.5% $H_2O_2$ and 20% M composition applied as a soil drench @ 1:132 strength solution; 0.75% v/v in 57 gallons of water per 1000 sq.ft area after seedling transformation)+*P. nicotianae* inoculated.
T6=aqueous/stabilized 12% PAA with 18.5% $H_2O_2$ and 20% AA composition (composition #1) followed by aqueous/stabilized 5.0% PAA with 27% $H_2O_2$ and 8% AA composition (Composition #2) followed by Beneficial Microbial formulation (BM) based on five species of *Bacillus* and one species of *Trichoderma*.

Step-1: Composition #1 applied as a soil drench @ 1:132 strength solutions; 0.75% v/v in 57 gallons of water per 1000 sq. ft. area after seedling transformation)+*P. nicotianae* inoculated.

Step-2: BM as a Transplant Root Dip (dipped the transplant roots in BM solution @ 1 oz. per 10 gallons of water for a minute prior to transplanting)

Step-3: Composition #2 applied @ 0.1% v/v; 1:1000 in 57 gallons of water per 1000 sq.ft at 7 and 14 days after transplanting Step-4: BM applied after 15 day of transplanting as a soil drench @ 0.56 oz/23 gallon of water per 1000 sq. ft. and again it was repeatedly applied as a soil drench @ 0.37 oz per 23 gallon of water).

Pots were arranged in a completely randomized block design on a bench in a greenhouse. Plants were watered twice a week and fertilized with Miracle-Gro plant fertilizer at twice a month. Each treatment had ten replicates and the experiment was performed twice. Two weeks post application, treatments were evaluated for disease assessment. Growth parameters such as height of the seedlings were measured after every 15 days, 30 days and 45 days. After 45 days, root systems were washed carefully by tap water then fresh roots were measured by root scanner.

Growth Measurements

Heights of the seedlings were measured after every 15 days, 30 days and 45 days post application. Average height of seedlings treated with chemical treatments and untreated non-inoculated control were significantly higher (P<0.05) than untreated inoculated control at all incubation periods (FIG. 1). However, there was no significant difference on average height of seedling between chemical treated treatments and untreated non-inoculated control at all incubation periods (FIG. 1).

FIG. 1 provides the height of the seedlings measured at 15, 30 and 45 days post application. Data are presented mean±SE. Different letters above bars denotes a statistical difference (P<0.05) between seedlings height according to independent T-test.

Root Growth Measurement 45 days after post application, root growth parameters were measured by root scanner. Root growth parameters were root length (FIG. 2A), root height (FIG. 2B), and root surface area (FIG. 2C). Statistical data analysis showed that chemical treated seedlings had significantly higher root growth parameters than untreated inoculated control (FIGS. 2A, B, C). However, chemical treated seedlings had significantly lower root growth parameters than untreated non-inoculated control (FIGS. 2A, B, C,) but there was no significant difference within chemical treated seedlings (T3, T4, T5 & T6).

FIG. 2 displays root growth parameters measured at 45 days post application. FIG. 2A displays root length (cm) in different treatments. FIG. 2B displays root height (cm). FIG. 2C displays root surface area ($cm^2$). Data are presented mean±SE. Different letters above bars denote a statistical difference (P<0.05) between root growth parameters according to an independent T-test. Bar represented standard errors of the mean.

Disease Incidence

Individual chemical treated treatments showed more positive activity than untreated inoculated control to reduce *Phytophthora* disease. Statistically data analyses revealed that percentage of disease incidence on untreated inoculated control was 65% whereas percentage of disease incidence in chemical treated treatments was 5-10% (FIG. 3).

FIG. 3 displays disease assessment per treatments under greenhouse condition. Data are presented mean±SE. Different letters above bars denote a statistical difference (P<0.05) according to an independent t-test. Bars represent standard errors of the mean.

Figure 4:
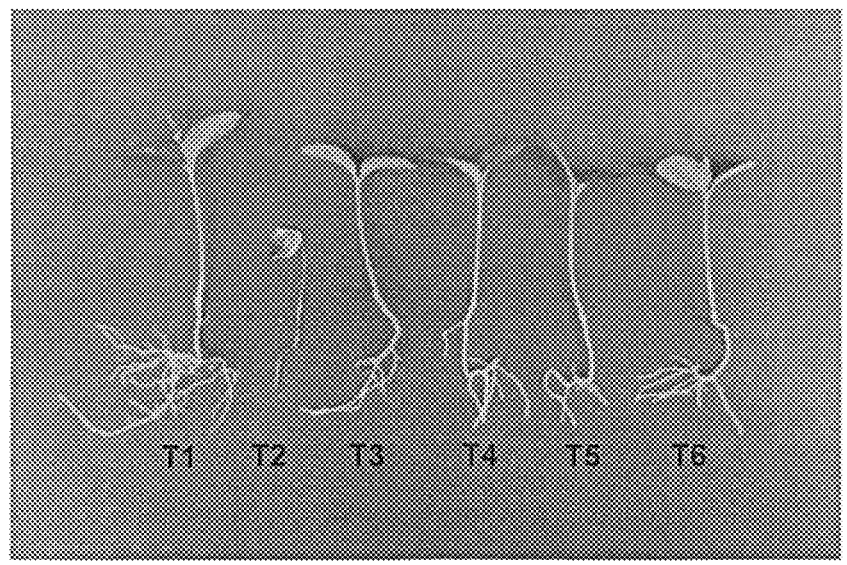
FIG. 4 is a photograph including treated seedlings and controls.

FIG. 4 is a photograph of seedling treated as follows: T1=Healthy seedling, T2=*Phytopthora* inoculated seedling, T5 and T6, as above.

In a presently preferred embodiment for strawberries, prior to planting, the soil is treated with a peroxyacetic acid composition including about twelve percent by weight peroxyacetic acid and about 18.5 percent by weight hydrogen peroxide at a rate of 40 gallons per acre. 24 hours after the application of the peroxyacetic acid composition the soil is inoculated with an inoculant composition including beneficial organisms including at least one of *Bacillus licheniformis, Bacillus subtilis, Bacillus pumilus, Bacillus amyloliquefaciens, Bacillus megaterium, Trichoderma harzianum,* and *Trichoderma reesei*, at a rate of 1-1.5 lb. per acre.

Preferably, every subsequent week a bactericidal/fungicidal composition including peroxyacetic acid is applied to the soil at a rate 1 to 1.5 gallons per acre followed by an application of the inoculant composition at a rate of 1-1.5 lb. per acre. Weekly treatments of bactericide/fungicide and inoculant are repeated for at least five weeks resulting in most resting spores germinating and being controlled.

Various modifications can be made in the details of the various embodiments of the process of the present invention, all within the scope and spirit of the invention and defined by the appended claims.

The invention claimed is:

1. A process for treating soil to control plant disease and nematodes, the process comprising
    (a) applying to the soil an effective amount of an aqueous composition consisting essentially of a mixture of acetic acid, peroxyacetic acid and hydrogen peroxide wherein the aqueous peroxyacetic acid composition comprises from 2.0 to 30 percent by weight peroxyacetic acid; and
    (b) inoculating the soil with beneficial organisms subsequent to the application of the aqueous composition to the soil within three days of the application of the aqueous composition.

2. The process according to claim 1 wherein the aqueous composition comprises from about 2.5 to 22.0 percent by weight peroxyacetic acid.

3. The process according to claim 1 wherein the aqueous composition further comprises from 10.0 to 22.0 percent by weight hydrogen peroxide.

4. The process according to claim 1 wherein the aqueous composition further includes at least one non-ionic surfactant.

5. The process according to claim 4 wherein the at least one non-ionic surfactant is an alcohol ethoxylate.

6. The process according to claim 1 wherein the aqueous composition is applied to the soil by a direct injection technique.

7. The process according to claim 1 wherein the aqueous composition is applied to the soil by a soil drench technique.

8. The process according to claim 1 wherein the beneficial organisms comprise one or more species of *Bacillus* and *Trichoderma*.

9. The process according to claim 8 wherein the beneficial organisms include at least one of *Bacillus licheniformis,*

*Bacillus subtilis*, *Bacillus pumilus*, *Bacillus amyloliquefaciens*, *Bacillus megaterium*, *Trichoderma harzianum*, and *Trichoderma reesei*.

10. The process according to claim 1 wherein the aqueous composition is applied to the agricultural medium by spraying, drenching, injecting, sprinkling or infusing the peroxyacetic acid composition into the agricultural medium.

\* \* \* \* \*